Nov. 25, 1958

C. S. PHILLIPS 2,861,527

SEEDING AND FERTILIZING DEVICE AND
HOSE SECURING MEANS THEREFOR

Filed May 23, 1955

INVENTOR.
CHARLES S. PHILLIPS.
BY Ward, Neal, Haselton,
Orme & McElhannon
ATTORNEYS.

Nov. 25, 1958
C. S. PHILLIPS
2,861,527
SEEDING AND FERTILIZING DEVICE AND
HOSE SECURING MEANS THEREFOR
Filed May 23, 1955
3 Sheets-Sheet 2
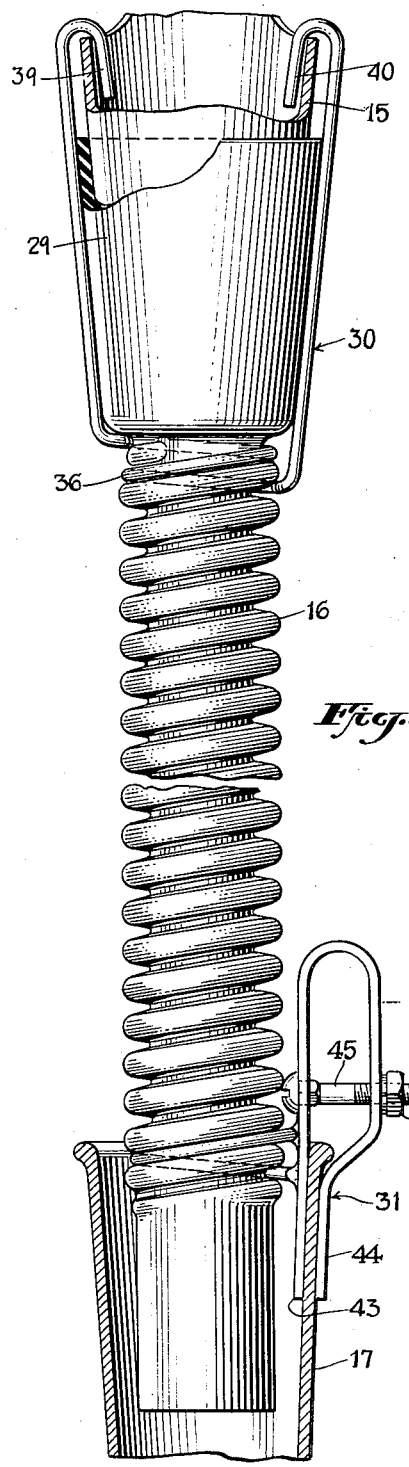
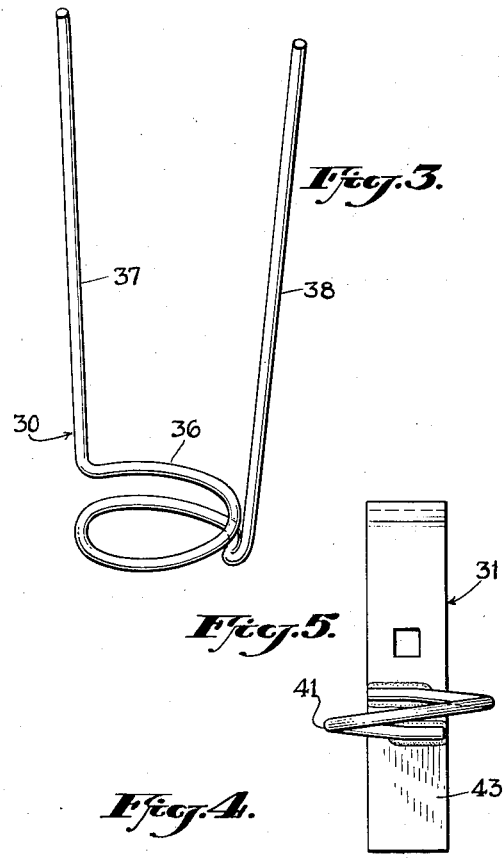
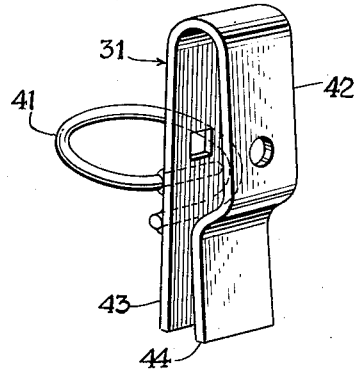
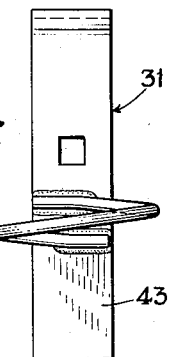
INVENTOR.
CHARLES S. PHILLIPS.
BY Ward, Neal, Haselton,
Orme & McElhannon
ATTORNEYS.

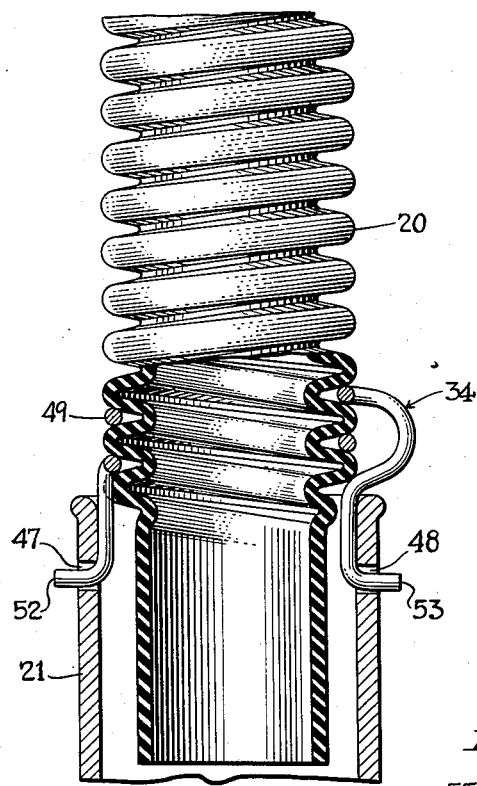
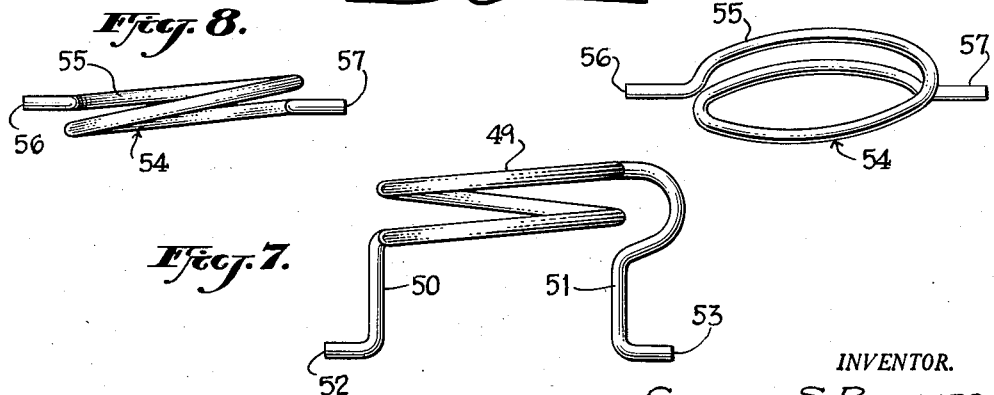

United States Patent Office 2,861,527
Patented Nov. 25, 1958

2,861,527

SEEDING AND FERTILIZING DEVICE AND HOSE SECURING MEANS THEREFOR

Charles S. Phillips, East Lansing, Mich., assignor to Thermoid Company, Trenton, N. J., a corporation of Delaware Application May 23, 1955, Serial No. 510,083

6 Claims. (Cl. 111—87)

This invention relates to seed drilling and fertilizer applying devices and to hose securing means for use therein.

Seed drilling and fertilizer applying devices are well known and usually include a plurality of laterally spaced ground turning devices, e. g. hoes or discs, a plurality of boots disposed rearwardly of the ground turning devices, one or more material containers, e. g. seed or fertilizer boxes, disposed above the boots and a plurality of flexible feed tubes or hoses interconnecting the containers and the boots for feeding the material from the containers to the boots.

Usually, such seeding and fertilizing devices are constructed so that the material containers are relatively fixed in vertical position whereas the boots and ground turning devices are floatingly mounted so that they follow the irregularities of the ground.

Conventional connections, between a feed box for fertilizer or seeds to a movable point of distribution, such as the boots, have usually been accomplished by means of metal tubes, the top portion of which is secured to spouts on the feed box by means of bolts or pins passing through the tube. The conventional tube is a metallic elongated cone formed by overlapping a flat metal strip. The lower end of such tubes is permitted to freely enter to a practical depth into the boot mounted on the movable discharge mechanism. Movement of this boot with respect to the feed box is confined to the extent to which the metal tube telescopes within the boot. Accidents of one kind or another often cause the metal tube to jump out of the receptable or to be crushed when compression stresses are excessive.

Replacement of the metal tubes by corrugated rubber tubes or hoses overcomes these difficulties due to their resilience and ability to stretch or compress to substantially higher limits than the metal tubes. Preferably, such hoses are made of neoprene rubber which resists the corrosive effects of fertilizer and which has a greater resistance to checking and cracking than other types of rubber. Because of the superior stretching characteristics and resiliency it is desirable to secure these rubber tubes or hoses at both ends, namely to the spouts at the feed box and also to the movable boots. By fastening the tubes to the boots, full control and assurance that the tube discharges the seed or fertilizer at the proper place is guaranteed.

In accordance with my invention, the ends of the corrugated tubes or hoses are held by securing means each of which comprises a member bent upon itself to form at least one turn and means extending from the turn adapted to engage the wall of the associated spout or boot with which the hose is connected. If the corrugations on the hose are annular, then the turn may be substantially a circular turn, the end of a hose being compressed and inserted through the turn until the turn is in encircling engagement with the hose and is in intermeshing engagement with the corrugations. However, preferably, the hose is spirally corrugated and the securing means comprises a helical turn so that the securing means may be turned on to the end of the hose in the same manner that a nut is turned on to a bolt until the desired position is reached or the desired grip is obtained.

If the member to which the hose is to be attached has a pair of apertures therein or other fastening means thereon, the means extending from the turn may be a pair of prongs which fit into the apertures or engage the fastening means. If no suitable apertures of fastening means are present, the means extending from the turn may be a U-shaped clamping member which engages the wall of the associated member. In some cases, the means extending from the turn may be a pair of arms having hooked ends which engage the wall of the associated member. In the preferred form, the securing means is a unitary device formed from a rod-like member so that such means are simple and inexpensive to make.

It will be noted from the foregoing and from the description given hereinafter that the securing means may be easily and quickly installed by unskilled mechanics. Furthermore, the hoses are held securely at their ends without extending a member through the wall of a hose. If holes are provided in the wall of a hose to permit passage of a member therethrough for securing purposes, local stresses are encountered which tend to tear the hose and during assembly of the securing means with the hose, difficulties are encountered in aligning the holes with the member.

Other objects and advantages of the invention will be apparent from the following detailed description of the manner in which I now prefer to practice the invention and from the accompanying drawings in which:

Fig. 2 is an enlarged, side elevation view, partly in cross section, of a feeding hose and its associated securing clips shown in Fig. 1;

Fig. 3 is a perspective view of one of the securing clips shown in Figs. 1 and 2;

Fig. 4 is a perspective view of another of the securing clips shown in Figs. 1 and 2;

Fig. 5 is a front elevation view of the securing clip shown in Fig. 4;

Fig. 6 is an enlarged, fragmentary, front elevation view, partly in cross section, of a feeding hose shown in Fig. 1 and of a modified form of securing clip;

Fig. 7 is a front elevation view of the securing clip shown in Fig. 6; and

Figs. 8 and 9 are front elevation and perspective views respectively of a modified form of securing clip which may be substituted for clips shown in Figs. 4–7.

Figure 1:
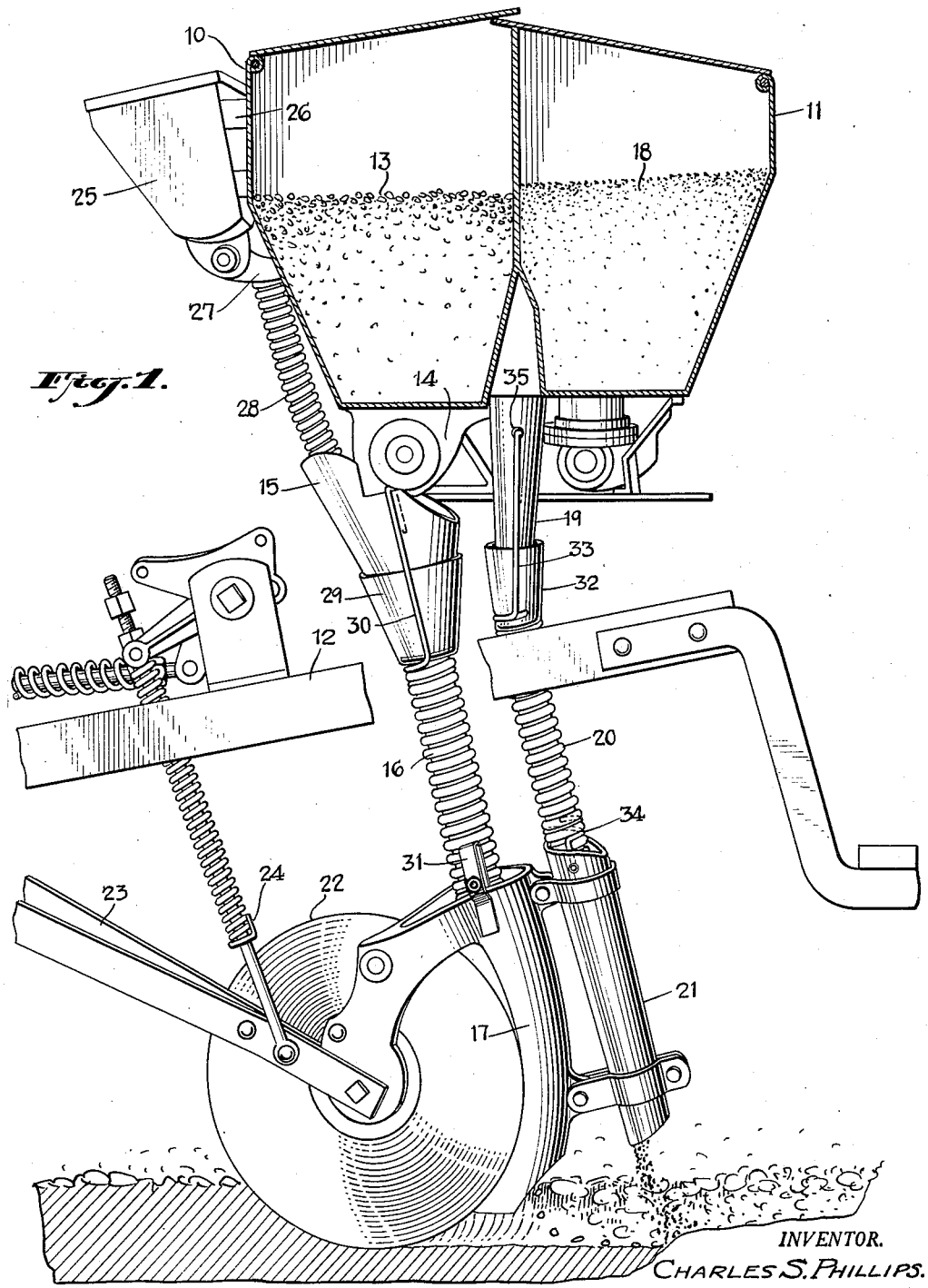
Fig. 1 is a fragmentary, side elevation view, partly in cross section, of a portion of a seed drilling and fertilizer applying device incorporating the invention.

As mentioned above, seeding and fertilizing devices are well known and there is shown in Fig. 1, only the portion of a conventional seeding and fertilizing device required in connection with the description of the invention. The portion of the device shown in Fig. 1 moves to the left as viewed in Fig. 1 during the seeding operation. A pair of material containers 10 and 11 are mounted on an upper supporting framework 12 which is connected to the pulling vehicle which may, for example, be a tractor. The container 10 may contain grain seed 13 which is fed through a plurality of laterally spaced tubular spouts, such as spout 15, and a plurality of laterally spaced flexible rubber hoses, such as hose 16, to a plurality of tubular feed shoes or boots, such as boot 17. Spout 15 is pivotally connected by means not shown to the chute 14.

The container 11 may contain fertilizer 18 which is fed through a plurality of spouts, such as spout 19, and a plurality of flexible rubber hoses, such as hose 20, to a second series of shoes or boots 21 attached to boots 17.

The boots 17 as well as the ground turning devices which may be a plurality of laterally spaced discs, such as disc 22, are carried by a lower framework 23 which is pivotally connected to either the upper framework 12 or the pulling vehicle. In this way, the boots 17 and the ground turning devices 22 are floatingly mounted with respect to the upper framework 12 and hence with respect to the material containers 10 and 11.

The upper framework 12 and the lower framework 23 are interconnected by a rod and spring assembly 24 which, during the seeding operation, permits the frameworks to move with respect to each other. Hoses 16 and 20 being made of rubber are sufficiently flexible and will stretch sufficiently without damage to permit the frameworks 12 and 23 to so move.

A further material container 25 which may, for example, be a grass seed box, may be also carried or supported by the framework 12, the container 25 being attached to the rear of the container 10 by means of a bracket 26. The material in the container 25 is fed through a plurality of spouts, such as spout 27, and a plurality of flexible rubber hoses, such as hose 28, to the spouts 15. Of course, if desired, container 25 and its associated spouts 27 and hoses 28 may be omitted.

Each hose 16 is externally corrugated throughout the middle portion thereof and is provided at its upper end with a funnel-shaped portion 29 which encircles the spout 15. Preferably, the middle portion of the hose 16 is spirally corrugated so that the upper securing clip 30 may be turned on the hose 16 from the lower end thereof, the securing clip 30 preferably having a helical turn as a part thereof as described hereinafter. The lower end of the hose 16 extends into the upper portion of the boot 17 and is held in its correct position by a lower securing clip 31.

Each hose 20 is similar to hose 16 and has a corrugated middle portion, a funnel-shaped upper portion 32 which encircles the lower portion of the spout 19, and a lower portion which extends within the upper portion of the boot 21. The upper portion of the hose 20 is held in position by a securing clip 33 which may be the same in form as the clip 30, and the lower end of the hose 20 is held in its proper position by means of a lower securing clip 34. The upper ends of the clip 33 extend into apertures in the spout 19, one aperture 35 being visible in Fig. 1.

The hose 16 and its associated securing clips are shown in greater detail in Figs. 2-5. From these figures it will be seen that the upper securing clip 30 comprises a unitary, rod-like member which is bent upon itself to form a helical turn 36 and a pair of arms 37 and 38 which extend from opposite ends of the turn 36 and which extend substantially parallel to the axis of the turn 36.

The inside diameter of the turn 36 is substantially the same as the diameter of the root portions of the corrugations on the hose 16 and the pitch of the turn 36 is substantially the same as the pitch of the corrugations on the hose 16 so that the clip 30 may be turned into position in the same manner as a nut is assembled with a bolt. Of course, the inside diameter of the turn 36 may be greater than the diameter of the root portions of the corrugations provided it is slightly less than the external diameter of the corrugations.

Before installation the arms 37 and 38 of the clip 30 are straight as shown in Fig. 3 but after the securing clip 30 has been placed on the hose 16 as shown in Fig. 2, so that the turn 36 is in encircling engagement with the hose 16 and is in intermeshing engagement with the corrugations of the hose 16, the hose 16 is mounted with the funnel-shaped portion 29 over the end of the spout 15 and the ends of the arms 37 and 38 may then be bent upon themselves to form hooks 39 and 40 which extend over the end of the wall of the spout 15 and thus engage the wall of the spout 15, preventing downward movement of the hose 16 away from the spout 15. However, if the length of the funnel-shaped portion 29 is greater than the length of the spout 15 which is inserted therein, the arms 37 and 38 may be bent to form the hooks 39 and 40 prior to assembly of the hose 16 with the spout 15, funnel-shaped portion 29 being forced upwardly until the ends of the hooks 39 and 40 can be pushed over the end of the wall of the spout 15. After the ends of the hooks 39 and 40 have been pushed over the ends of the wall of the spout 15, the hose 16 may then be pulled downwardly so that it assumes the position shown in Fig. 2.

As mentioned above, the securing clip 33 has substantially the same form as the securing clip 30. If desired, the ends of the arms 37 and 38 need not be bent to the extent indicated in Fig. 2. The amount of bending of the ends of the arms 37 and 38 will depend upon the size of the apertures in the spout 19 into which the hooks 39 and 40 extend, the length of the hooks 39 and 40 and the resiliency of the material from which the clip 33 is made.

The lower securing clip 31 includes first portion 41 which may be made from a rod-like member which is formed in the shape of a helical turn. The portion 41 encircles the lower portion of the hose 16 in the manner shown in Fig. 2. As with the turn 36, the portion 41 has an inside diameter which is substantially the same as the diameter of the root portions of the corrugations on the hose 16 and if the corrugations on the hose 16 are of spiral form, the pitch of the portion 51 is the same as the pitch of the corrugations.

The lower securing clip 31 also has a second portion comprising a U-shaped member 42 which is secured to the portion 41 such as by welding. When the clip 31 is mounted on the boot 17, the legs 43 and 44 of the member 42 receive the wall of the boot 17 therebetween. Clamping means in the form of a bolt 45 and a nut 46 extends between the legs 43 and 44 and may be used to force the legs 43 and 44 toward each other so as to grip the wall of the boot 17 therebetween. However, if the member 42 is made of an elastic material such as spring steel, the gripping action of the legs 43 and 44 on the wall of the boot 17 may be sufficient to hold the hose 16 in the required position without the use of the clamping means 45 and 46.

Two alternate forms of the lower securing clip are shown in Figs. 6-9. The clip 31 shown in the preceding figures is intended primarily for use in cases where the boot 17 is not provided with apertures or other clip engaging means. If the boot 17 is provided with clip engaging means such as the apertures 47 and 48 shown in Fig. 6, a simpler form of securing clip 34 may be employed.

For purposes of explanation, the clip 34 is shown in connection with a hose 20 and a boot 21, although it will be understood that if boot 17 is provided with clip engaging means as aforesaid, the clip 34 may be substituted for the clip 31. Alternatively, the clip 31 may be substituted for the clip 34.

The securing clip 34 is similar in form to the upper securing clip 30 and may be formed from a unitary, rod-like member bent upon itself to form a helical turn 49 and a pair of arms 50 and 51 which extend from opposite ends of the turn 49 and which extend substantially parallel to the axis of the turn 49. The ends of the arms 50 and 51 are bent outwardly from the turn 49 to provide hooks or prongs 52 and 53. Prior to insertion of the hose 20 into the end of the boot 21, the clip 34 is turned on to the end of the hose 20 so that the portion 49 encircles the hose 20 and is in intermeshing engagement with the corrugations on the hose 20. The end of the hose 20 is then inserted into the end of the boot 21 and at the same time the arms 50 and 51 are sprung inwardly to permit the prongs 52 and 53 to enter into the boot 21. After the clip 34 is pushed into the boot 21 a sufficient distance the prongs 52 and 53 enter into the apertures 47 and 48, permitting the arms 50 and 51 to spring outwardly to the positions shown in Fig. 6.

If the hose 20 is of sufficient length or may be stretched the required amount, the clip 34 may be replaced by the clip 54 shown in Figs. 8 and 9. The clip 54 differs from the clip 34 primarily by the omission of the arms 50 and 51. The clip 54 is also formed from a unitary, rod-like member which is bent upon itself to form a helical turn 55 and a pair of prongs 56 and 57 which extend outwardly from the turn 55 and which are in substantially the same plane as the turn 55. When used to secure the lower end of the hose 16 or the hose 20, the turn 55 encircles the hose and is in intermeshing engagement with the corrugations of the hose. Also, the prongs 56 and 57 extend into the apertures 47 and 48 in the wall of the boot, such as the boot 21, to which the end of the hose 20 is secured.

Although in each of the above embodiments of the clips a single turn is shown, it will be understood that a different number of turns may be employed. Also, although it is preferred that at least a portion of each clip be formed from a rod-like member, it will be understood that members of other configurations may be employed in place of the rod-like member.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. In a device of the character described having a ground turning member, a tubular feed boot, a material container having a tubular feed spout connected thereto and means for floatingly mounting said ground turning member and boot with respect to said container providing for relative movement of said spout and boot toward and away from each other, the combination with said spout and boot of a longitudinally stretchable and compressible resilient corrugated wall hose interconnecting said spout and boot and a pair of clips firmly securing the top and bottom ends of said longitudinally stretchable and compressible resilient corrugated wall hose to said spout and said boot respectively, each said clip comprising at least one relative rigid turn of a rod-like member having a preformed internal diameter encircling the root diameter of said hose and in intermeshing engagement with the corrugated walls thereof, the first one of said clips also comprising means for attaching said clip to said spout and the second of said clips also comprising means for attaching said second clip to said boot.

2. A device as set forth in claim 1 in which the means for attaching at least one of said clips to one of said tubular members comprises portions extending from opposite sides of said turn respectively for interfitting engagement with oppositely disposed sides of said one of said tubular members for supporting said hose from its opposite sides.

3. A device as set forth in claim 1 in which the means for attaching at least one of said clips to one of said tubular members comprises a pair of arms extending from opposite sides of said turn, the ends of said arms remote from said turn being in interfitting engagement with the wall of said one of said tubular members.

4. A device as set forth in claim 1 in which the means for attaching at least one of said clips to one of said tubular members comprises a pair of arms extending from opposite sides of said turn and extending substantially parallel to the axis of said turn, the ends of said arms remote from said turn being bent upon themselves to form hooks directed inwardly toward said axis and being in supporting engagement with the wall of said one of said tubular members.

5. A device as set forth in claim 1 in which the means for attaching the second of said clips to said boot comprises a U-shaped member secured to the ends of said rod-like member, said U-shaped member having a portion of one leg adjacent its free end offset toward said other leg to provide therewith clamping jaws adapted to engage the wall of said boot therebetween and having clamping means extending between said legs at a point intermediate the closed end of said U-shaped member and said offset portion for forcing said jaws into engagement with said boot wall.

6. In a device of the character described having a plurality of laterally spaced ground turning members, a plurality of feed boots, a material container having spouts connected thereto and means for floatingly mounting said members and feed boots with respect to said container providing relative movement of said spouts and boots toward and away from each other, the combination with said spouts and boots of a plurality of longitudinally stretchable and compressible resilient corrugated wall hoses interconnecting said spouts and boots, means for firmly securing opposite ends of said hoses to said spouts and boots respectively, said securing means for each hose comprising an upper clip and a lower clip, said upper clip comprising a member bent upon itself to provide a turn and a pair of arms extending from the opposite end of said turn and directed substantially parallel to the axis of said turn, said turn encircling said hose in intermeshing engagement with corrugations of said resilient hose adjacent its upper end and said arms at their outer ends securely engaging the wall of said spout, and said lower clip comprising a first member formed into a turn encircling said hose in intermeshing engagement with the corrugations of said hose adjacent its lower end, said lower clip also comprising a U-shaped member secured to the first member of said lower clip with the legs of the U extending downwardly and providing clamping jaws between which are firmly engaged a wall portion of said boot.

References Cited in the file of this patent
UNITED STATES PATENTS

| Re. 11,829 | Poindexter | June 5, 1900 |
| 313,667 | Hesser | Mar. 10, 1885 |
| 490,728 | Van Brunt | Jan. 31, 1893 |
| 709,531 | Blezinger | Sept. 23, 1902 |
| 805,579 | Patchen | Nov. 28, 1905 |
| 814,957 | Ham | Mar. 13, 1906 |
| 1,006,771 | Metzler | Oct. 24, 1911 |
| 1,095,504 | Jannoch | May 5, 1914 |
| 1,423,119 | King | July 18, 1922 |
| 1,474,322 | Ducorron | Nov. 13, 1923 |
| 1,547,178 | Long | July 28, 1925 |
| 2,058,539 | Welty et al. | Oct. 27, 1936 |
| 2,155,800 | Perazo | Apr. 25, 1939 |
| 2,234,656 | Schmalz | Mar. 11, 1941 |
| 2,276,779 | Isenberg | Mar. 17, 1942 |
| 2,543,934 | Poskey | Mar. 6, 1951 |
| 2,592,053 | Megla | Apr. 8, 1952 |

FOREIGN PATENTS

| 48,531 | Germany | Sept. 2, 1889 |
| 815,184 | Germany | Oct. 1, 1951 |